(12) United States Patent
Buchanan et al.

(10) Patent No.: US 7,256,516 B2
(45) Date of Patent: Aug. 14, 2007

(54) BATTERY CHARGING SYSTEM AND METHOD

(75) Inventors: William D. Buchanan, Azusa, CA (US); Joseph F. Mohos, Burbank, CA (US); Wally E. Rippel, Altadena, CA (US)

(73) Assignee: Aerovironment Inc., Monrovia, CA (US)

( * ) Notice: Subject to any disclaimer, the term of this patent is extended or adjusted under 35 U.S.C. 154(b) by 83 days.

(21) Appl. No.: 10/616,542

(22) Filed: Jul. 10, 2003

(65) Prior Publication Data

US 2004/0130292 A1    Jul. 8, 2004

Related U.S. Application Data

(63) Continuation-in-part of application No. 09/881,561, filed on Jun. 14, 2001, now abandoned.

(60) Provisional application No. 60/212,066, filed on Jun. 14, 2000.

(51) Int. Cl.
*H02J 7/04* (2006.01)
(52) U.S. Cl. .................... 307/62; 307/82; 320/109
(58) Field of Classification Search ............... 320/109, 320/126, 124; 307/43, 80, 35, 62, 82; 700/297
See application file for complete search history.

(56) References Cited

U.S. PATENT DOCUMENTS

| | | | | |
|---|---|---|---|---|
| 4,324,987 A * | 4/1982 | Sullivan et al. | ............... | 307/35 |
| 4,345,162 A * | 8/1982 | Hammer et al. | ............... | 307/39 |
| 4,351,013 A * | 9/1982 | Matsko et al. | ................ | 361/96 |
| 5,631,536 A * | 5/1997 | Tseng | .......................... | 320/137 |
| 5,724,237 A * | 3/1998 | Hunter | ........................ | 363/65 |
| 5,874,823 A * | 2/1999 | Suzuki | ....................... | 320/125 |
| 5,926,004 A * | 7/1999 | Henze | ........................ | 320/109 |
| 6,003,139 A * | 12/1999 | McKenzie | .................. | 713/300 |
| 6,225,776 B1* | 5/2001 | Chai | .......................... | 320/109 |
| 6,304,006 B1* | 10/2001 | Jungreis | ...................... | 307/64 |
| 6,357,011 B2* | 3/2002 | Gilbert | ....................... | 713/300 |
| 6,842,668 B2* | 1/2005 | Carson et al. | .............. | 700/286 |

(Continued)

OTHER PUBLICATIONS

"Written Opinion of the International Searching Authority," dated Aug. 19, 2005, of the corresponding international application.

*Primary Examiner*—Michael Sherry
*Assistant Examiner*—Andrew Deschere
(74) *Attorney, Agent, or Firm*—Law Office of John A. Griecci (57) ABSTRACT

A charging system for simultaneously charging the batteries of a plurality of battery powered vehicles. The charging includes one or more DC-DC power converters having one or more charging ports configured to plug into the batteries. The DC-DC power converters are each configured to selectively connect to more than one charging port to selectively provide for higher port power levels. The DC-DC power converters connect to an AC rectifier through a DC bus. The AC rectifier connects to an AC power source having a limited power rating. The AC charging system also has a controller that controls the operation of the DC-DC power converters such that the total power draw on the AC rectifier does not exceed the power rating. The system is further configured such that the DC-DC power converters can drain selected batteries to obtain power for charging other batteries, thus allowing for batteries to be cycled.

30 Claims, 5 Drawing Sheets

U.S. PATENT DOCUMENTS

2001/0040798 A1* 11/2001 Appelberg et al. ............ 362/20
2002/0157931 A1* 10/2002 Smith ...................... 200/50.33
2003/0007369 A1* 1/2003 Gilbreth et al. ............... 363/35

* cited by examiner

BATTERY CHARGING SYSTEM AND METHOD

BACKGROUND

The present application is a continuation-in-part of application Ser. No. 09/881,561, filed Jun. 14, 2001 now abandoned, which claims priority from Provisional Application Ser. No. 60/212,066, filed Jun. 14, 2000, both of which are incorporated herein by reference for all purposes.

This invention relates generally to battery charging systems and methods for charging batteries and, more particularly, to a cost-efficient charging system and method for simultaneously charging the batteries of a plurality of electrically powered vehicles such as forklifts.

Increasing numbers of vehicles (e.g., forklifts) are being manufactured as electric vehicles. Vehicle charging systems for the batteries of larger numbers of vehicles, such as for a fleet of forklifts vehicles, are therefor increasingly important. The implementation of such charging systems in existing facilities' electrical systems (e.g., building electrical systems) presents significant problems that can lead to large capital expenditures, as described below.

Parallel Charging

Facilities' electrical systems are typically formed in a multi-level, branched architecture. At each branching level, a plurality of receiving circuit breakers draws current from a distributing circuit breaker, which must have a current capacity equal to (or greater than) the sum of those of the circuit breakers that it distributes to. Each of the receiving circuit breakers in turn act as distributing circuit breakers to other circuit breakers till the end of each branch, i.e., a load such as a charging system, is reached. Because the electrical system power typically originates from an AC source, a load requiring DC power, such as a battery charger, will typically require an AC rectifier upstream from the load.

Figure 1:
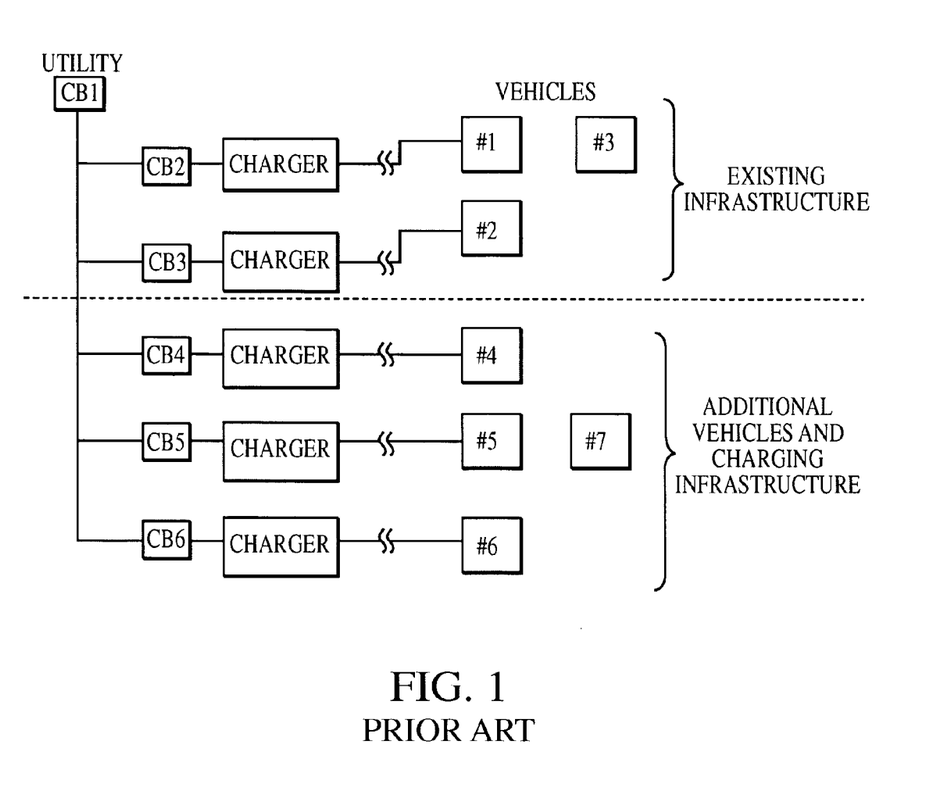
FIG. 1 is a schematic representation of a prior art vehicle charging system that has received a first prior art form of upgrade to support additional vehicles.

As shown in FIG. 1, an existing charging system, will typically include a system/utility circuit breaker (CB1) connected in series with a number of vehicle chargers, each of which has its own associated circuit breaker (CB2 and CB3). Each charger can charge one vehicle at a time (vehicle #1 or #2), and can operate at any current up to the limit of its associated circuit breaker. Typically the system circuit breaker has the capacity to operate at a current level up to the sum of each of the charger's circuit breakers, so the current limit of the system circuit breaker CB1 will be at or slightly over the sum of the existing associated circuit breakers CB2 and CB3.

Upgrading such a charging system to charge greater numbers of vehicles (or installing a battery charging system where none is in place) can significantly increase the current carried by the system circuit breaker, and therefore it will likely need to be upgraded to carry additional current. Increasing the maximum current capacity of the system circuit breaker (and related power transmission equipment) that supports the battery charging system requires increased capacity in each distributing circuit breaker upstream (along the circuit) from that system circuit breaker. Thus, increasing the number of vehicles that can be charged can potentially require expensive upgrading of a substantial portion of the facility's electrical system, requiring significant capital expenditures.

For example, as depicted in FIG. 1, in order to simultaneously charge additional vehicles (#4, #5 and #6), additional circuit breakers (CB4, CB5 and CB6), additional chargers and additional wiring are added to the system. The addition of these new circuits to the system requires that all name plate ratings of charging circuit breakers (CB2 to CB6) be added up to establish a new current value that the rating of the system wiring or of the system circuit breaker (CB1) cannot exceed. This is required even though the individual chargers might not all be in use at the same time and, if they are in use, they will most likely not be simultaneously operating at full power and fully utilizing the existing infrastructure. Not only will the system circuit breaker (CB1) need upgrading, but many or all of the upstream circuit breakers will need to be upgraded to support the system circuit breaker's (CB1) additional capacity. Thus, the capital expense of adding vehicle chargers to a system potentially includes the significant costs of upgrading a significant portion of the entire electrical system.

Furthermore, the batteries in each vehicle will likely have different charging requirements. For example, in FIG. 1 vehicle #1 might only need a low current for equalization, while vehicle #2 might need a larger current for fast-charging. While the chargers can be configured to handle either load level, the capacity of the charger used on vehicle #1 will be wasted even though the facility's entire electrical system was rebuilt to support the larger load.

As a result, the capital investments necessary to provide new or increased battery charging systems do not have an efficient, high and/or maximum rate of return. Additionally, where significant additional installations of battery chargers are desired, major costs might be incurred to upgrade a facility's electrical system even though the fundamental level of power available in the building is sufficient to supply the total kW hrs of power needed.

Sequential Chargers

One known approach to this problem is to install sequential chargers. Sequential chargers utilize charge capability in an improved, but not especially efficient, manner. Sequential chargers use a set of switches to connect a single charger to a series of vehicles.

Figure 2:
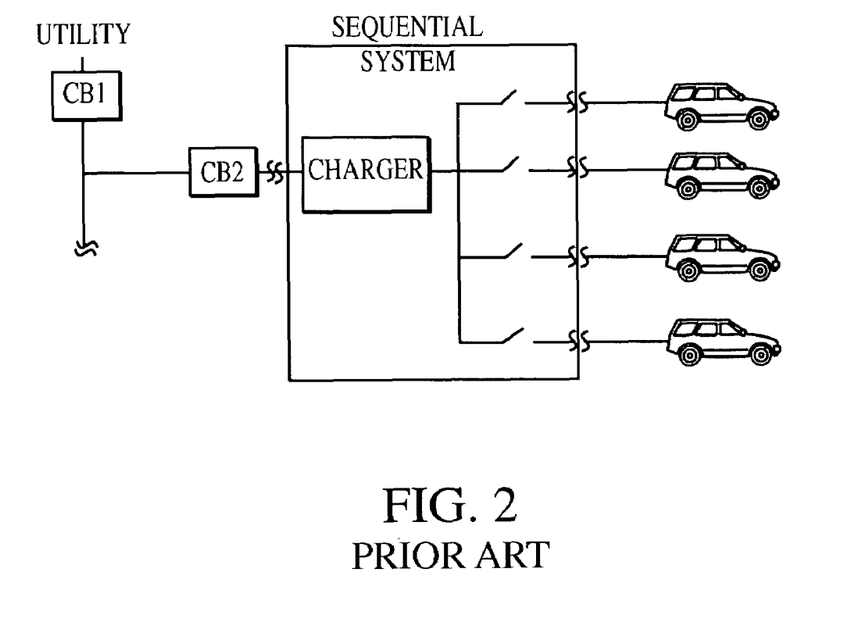
FIG. 2 is a schematic representation of a prior art vehicle charging system that has received a second prior art form of upgrade to support additional vehicles.

As depicted in FIG. 2, with sequential chargers, additional vehicles can be added to an existing system without the need for additional current, and thus, without upgrading the entire electrical system. However, only one vehicle can be charged at a time in such a system. To the degree that this fully utilizes the facility's installed electrical system capacity for that branch, this reaches optimum usage during a normal battery charge event. However, during a typical battery charge cycle the amount of delivered current drops as the battery is more fully charged. Thus the charger will at best only fully utilize the utility during the initial stages of charging. Furthermore, where the battery charging is not a maximum level for reasons related to accommodating battery life characteristics, such as the battery voltage, charge acceptance, and optimum power, a non-optimal level will be achieved. For example temperature may limit the charge rate, SOC may limit the charge rate, or the battery charger current limit may limit the charge rate, such as when a 60 volt capable charger charges a 24 volt battery at the same current, providing a much lower power requirement.

Additionally, the contactors and wiring of the sequential chargers are large. To the degree that a certain number of vehicles must be charged in a given time, the charger capacity must be increased by a minimum of the number of vehicles. This further aggravates the first problem as a larger charger is further underutilized, and the charger's components all are larger to accommodate the higher charge rate.

Accordingly, there has existed a definite need for a cost-efficient charging system and a method for simultaneously charging a plurality of vehicles. The present invention satisfies these and other needs, and provides further related advantages.

SUMMARY OF THE INVENTION

The present invention provides a cost-efficient charging system and a method for simultaneously charging a plurality of batteries, typically being incorporated into vehicles such as forklifts. Preferably, the present invention provides a charging system capable of limiting the power drawn from a utility, such as a facility's electrical system, to a given nameplate rating, while allocating the power to a set of connected batteries based on parameters that can be manually entered, sensed, programmed, and/or otherwise be determined.

The charging system of the invention includes one or more battery chargers, to be connected to a facility's electrical system, having one or more charging ports configured to be received by the batteries to be charged. The charging ports either connect directly to the batteries or connect to the batteries via a connection system on a device that incorporates the battery, such as a vehicle. The charging system may include a power management controller, either in a particular device or over a distributed system, and/or may include a system configured to sense a battery's charging requirements/state, either directly or via communication with the device that incorporates the battery.

An advantage of at least some embodiments of the invention is that the utility power requirements of the charging system on a facility's electrical system are managed by the power management controller to meet the facility's overall electrical system requirements by managing the load allocated to each of the charging systems' connection ports. By varying the power allocation in a logical fashion, multiple charging requirements can be met while meeting the utility power requirements.

Another advantage of at least some embodiments of the invention is that, by design, the system will be capable of simultaneous or parallel charging. This allows for various levels of charging to simultaneously occur, such as equalizing occurring on one battery while fast-charging is occurring on another. Since multiple vehicles are allowed to charge at different rates at the same time and from the same utility connection, the utility can be utilized to maximize the return on capital investment or even to prevent requiring further capital expenditures.

Yet another advantage of at least some embodiments of the invention is that they provide for selectively parallel operation of individual charging systems (e.g., individual power converters). In particular, the embodiments' internal circuitry includes switching connections such that the amount of output power to a battery can be greater than one of the charging system's power converters would normally be capable. This allows for chargers having a capacity lower than the maximum needed capacity, which lowers the cost per charger. This feature can be extended to cover a large number of power processing circuits, which could be assigned at will to an individual port to match any given power allocation strategy.

Furthermore, if power ports of the present invention are designed to be capable of both charging or discharging the electric powered vehicles, (i.e., bidirectional operating power ports), then the chargers can supplement the available utility power with power that is stored in one or more vehicles that do not presently need to be fully charged. This capability advantageously allows charging strategies wherein vehicles that are not presently in use are charged when the charging capacity is available, and are used to provide even greater capacity for charging other vehicles when capacity is needed. By employing this strategy, the charging system's capacity can be more easily scheduled to take full advantage of periods of lower charging usage. This concept can also be implemented using storage batteries that are dedicated and maintained for this purpose.

The capability of discharging one battery to provide power for another battery also advantageously provides for the energy efficient maintenance of the batteries. In particular, batteries can selectively be cycled down through a substantially drained state prior to charging so as to increase battery life, maintain maximum voltage levels and better maintain the condition of the battery. The drained power is reused in other batteries, thereby providing for energy efficiency along with battery maintenance.

Another advantage of at least some embodiments of the present invention is that the chargers, which preferably contain DC-DC converters, can have charge controllers that control the duty cycle of each converter so as to reduce the overall current harmonics that are seen by an upstream AC rectifier. Controlling the duty cycles to suppress current harmonics increases energy efficiency. Due to structural similarities, at least some embodiments of the present invention are particularly suitable to implementing this feature in a form described in U.S. Pat. No. 5,751,150, which is incorporated herein by reference.

Embodiments of the invention may also be configured to efficiently be adaptable to a wide variety of power-source configurations while maintaining the same charge-port configuration. For example, a single embodiment of the invention could be configured with a power port that accepts power at 400 Hz, 60 Hz and 50 Hz, while including modular chargers that see no difference between the different power sources.

Other features and advantages of the invention will become apparent from the following detailed description of the preferred embodiments, taken in conjunction with the accompanying drawings, which illustrate, by way of example, the principles of the invention.

DETAILED DESCRIPTION OF THE PREFERRED EMBODIMENTS

Figure 3A:
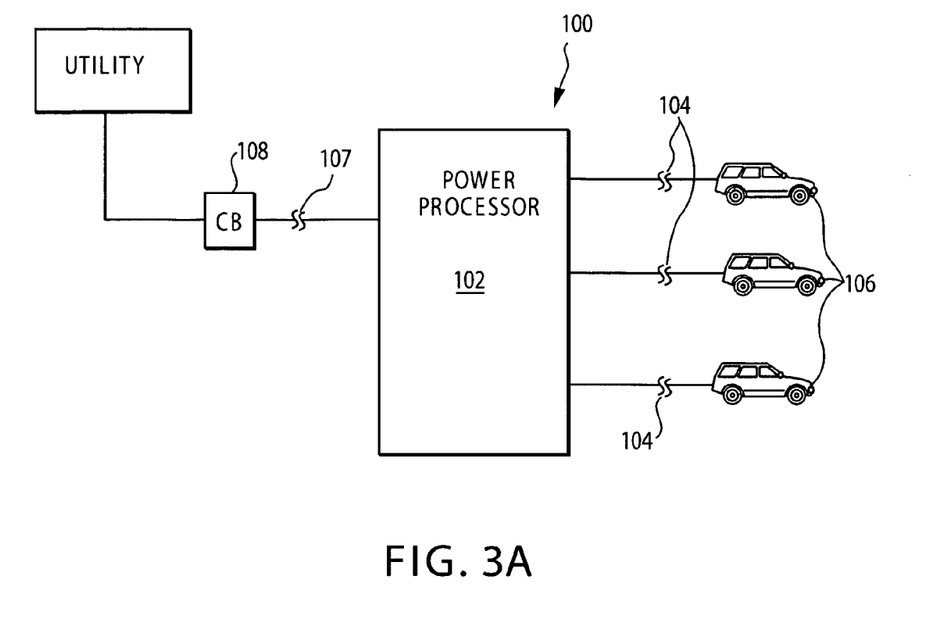
FIG. 3A is a schematic representation of a first generic vehicle charging system embodying features of the present invention.

A first embodiment of an electrical power distribution system according to the present invention is a vehicle charging system 100 shown in FIG. 3A. The charging system includes a system controller, a power processor 102 and a series of one or more (and preferably a plurality of) secondary power ports 104 that are configured for connecting to the batteries of one or more vehicles 106 (i.e., to loads placed on the distribution system). Each secondary power port has a power rating, which is preferably adequate to meet the charging needs of vehicles that will be charged via that secondary power port. The sum of the secondary power ports' power ratings defines an aggregate output power rating.

The charging system 100 preferably receives power from a power system, e.g., a utility having an AC electrical system. This power is received by a primary power port 107A, which in turn provides the power to the power processor. The power is received by the primary power port through a circuit breaker 108A that defines a total name plate current rating that is available to the charging system (or to the system and other loads that share the circuit breaker). The total name plate current rating, less the requirements of any other loads that share the circuit breaker, define the power rating of the primary power port. The primary power port is the power source for the charging system, and the total power rating of the primary power port is thus the power rating for the power source. This power rating is therefore a maximum power limit over which power cannot be drawn from the power source. Typically, the charging system will provide as much power to the vehicle batteries as their charging needs merit (i.e., as much power as would be appropriate and/or desirable under a chosen charging technique, given the status of the battery, it's intended battery life, and/or the time allotted for charging), up to the maximum power limit.

Other circuit breakers may be located along the electrical system, and all of these circuit breakers can be configured to limit the current passing through a wide variety of branches in the overall electrical system infrastructure. In particular, the utility circuit breaker 108A is configured such that it preferably limits the current received by the power processor 102 via the primary power port 107A (and any other devices to which it provides power) to a level not exceeding the allowed portion of the requirements of the components upstream from it in the electrical system.

The charging system 100 is typically configured such that the aggregate output power rating is greater than the maximum power limit of the power source. Such a configuration can allow for the charging system to have a large number of secondary power ports, which can support both the high speed charging of a limited number of vehicles (while some power ports remain inactive), and the low speed charging of a large number of vehicles.

The power processor 102 preferably rectifies the current and manages the load allocated to the charging systems' secondary power ports 104. In doing so, it manages the power flow to the secondary power ports, and thereby manages the power requirements that the charging system places on the utility so as to maintain a current level below that required by the circuit breakers and other electrical system components upstream from the charging system. To manage the allocated load, the power processor can issue power limit commends that limit the power allocations to (and the power distributed by) at least one, and preferably some or all of the secondary power ports.

Thus at any given time, the power provided by the power source, which is primarily passed to and distributed by the secondary power ports, does not exceed the power-source maximum power limit, i.e., the total power passing through and provided by the primary power port does not exceed a designated power limit of the power rating of the primary power port. By varying the power allocation between the secondary power ports in a logical fashion, multiple vehicle charging requirements, needs and preferences can be met while not exceeding this maximum power limit of the power source.

Figure 3B:
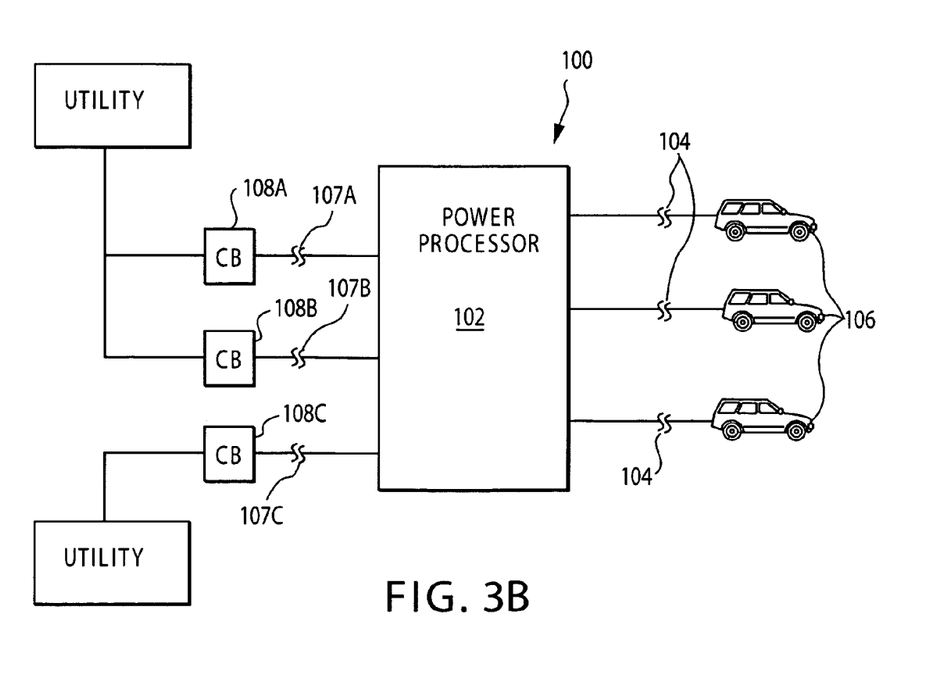
FIG. 3B is a schematic representation of a second generic vehicle charging system embodying features of some alternative embodiments of the present invention.

In alternative embodiments, as depicted in FIG. 3B, the charging system 100 could receive additional power from the utility, via a second primary power port 107B, to the power processor 102, through a utility's second circuit breaker 108B. Also, the charging system could receive additional power from a second utility, via a third primary power port 107C, to the power processor, through a second utility's circuit breaker 108C. This concept, which is different from the above-described case of the electrical power distribution system receiving power-source power only through the one primary power port, can be extended to additional primary power ports, circuit breakers and/or utilities.

In these alternative embodiments, the limit of each circuit breaker of each utility defines a total name plate current rating that is available to that circuit breaker's primary power port (or to the primary power port and other loads that share the circuit breaker). That total name plate current rating, less the requirements of any other loads that share that circuit breaker, defines the power rating of that primary power port. The combination of utilities from which the primary power ports receive power forms the power source, and the sum of the primary power ports' power ratings defines the power-source power rating for the charging system, and thus the maximum power limit of power available from the power source. The charging system 100 is typically configured such that the aggregate output power rating is greater than the power-source power rating.

Preferably, in these alternative embodiments, the power processor 102 rectifies the current and manages the load allocated to some or all of the charging systems' secondary power ports 104 such that the total power distributed by the secondary power ports does not exceed a designated power limit, being the power-source maximum power limit. Furthermore, the power processor preferably manages the power provided by each utility via each primary power port such that the provided power does not exceed a designated primary-power-port power limit, being the primary power port's power rating. As such, the power processor can be adapted to work with a variety of utilities providing different levels of power and/or different types of current (e.g., DC and polyphase AC). Additionally, the power processor might be configured to regulate and balance the power drawn from each utility to optimize efficient power use (such as by drawing from less expensive utilities first). Other than as described above, the alternative embodiments are similar to the first embodiment.

Figure 4:
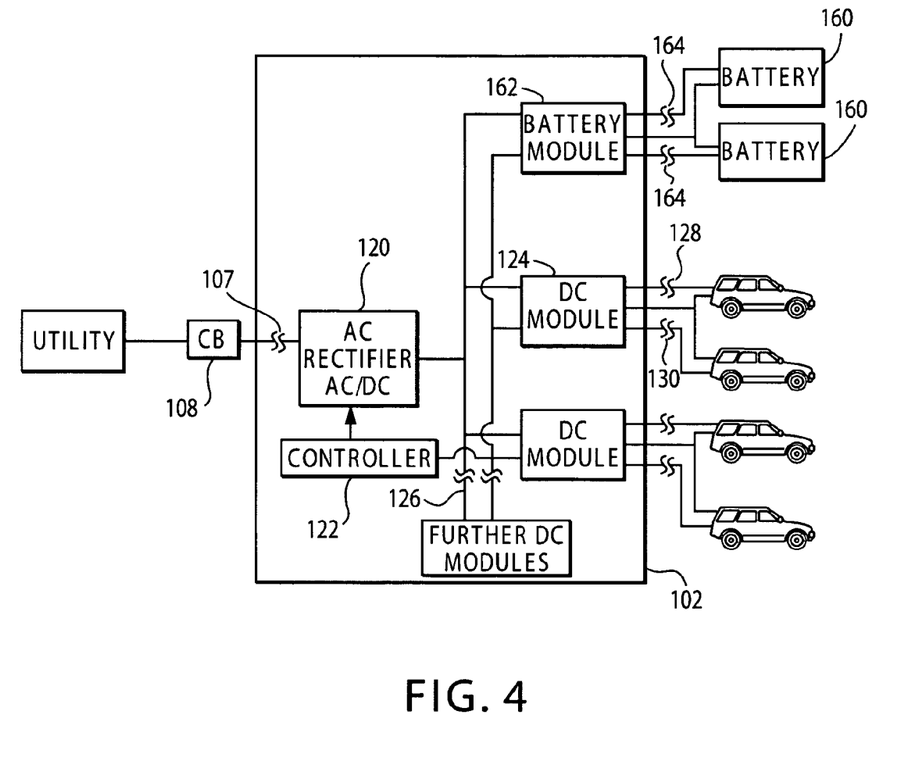
FIG. 4 is a schematic representation of an embodiment of the vehicle charging system depicted in FIG. 3.

Returning to the first embodiment, and with reference to FIG. 4, the power processor 102 preferably includes an AC rectifier 120, a power controller 122 and one or more (preferably a plurality of) DC charging modules 124 that receive power from the AC rectifier over a DC bus 126. The power controller forms at least part of the system controller. The DC modules can be, but are not necessarily, located in proximity with each other.

The AC rectifier 120 preferably converts a standard three phase alternating current from the utility's circuit breaker 108A via the primary power port 107A to a regulated DC voltage. A wide array of means for rectifying are known in the industry, including those having active rectification with live commutated devices, switching devices such as IGBTs, and uncontrolled devices such as diodes. All such rectifying means are within the scope of the invention. Furthermore, if a DC source is used, no rectifying means is necessary for the operation of the invention. Alternatively, the AC rectifier can be configured to accept a variety of other currents, and can be configured to accept more than one type of current.

The power controller 122 manages the regulation and rectification of the utility's power, and can optionally regulate the DC bus 126 (in other words, the DC bus can be regulated or unregulated). The power controller also serves as a point-of-allocation for the assignment of the available power to individual DC modules 124 based on the number of vehicles, SOC (state-of charge) numbers, amp-hour charging system capacity and/or reserve capacity (as well as any other factors that might influence power requirements and availability). This information is then preferably used by each DC module to regulate the output power to one or more vehicles connected to a first and a second (or perhaps more) associated secondary power ports 128 and 130, respectively. Alternatively, the power controller could regulate the power supplied to each DC module.

Figure 5:
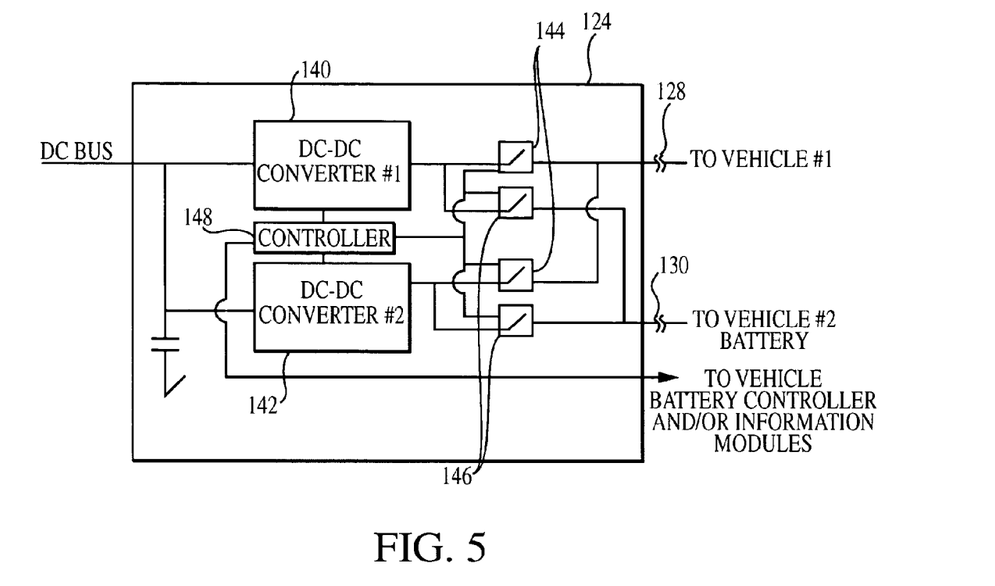
FIG. 5 is a schematic representation of a DC module as identified in the embodiment of the vehicle charging system depicted in FIG. 4.

With reference to FIGS. 4 and 5, each DC module 124 of the preferred embodiment would preferably include a first DC-DC converter 140, a second DC-DC converter 142, two first connection switches 144, either one or (more preferably) two second connection switches 146, and a distribution controller 148 that is preferably in communication with the power controller 122, the DC-DC converters, the connection switches, and preferably with sensory equipment configured to sense the status of batteries connected to the first and/or second associated secondary power ports 128, 130. Like the power controller, the distribution controllers form part of the system controller.

In each DC module 124, the two first connection switches 144 respectively connect the first and second DC-DC converters, 140 and 142, to the first associated secondary power port 128. Likewise, the one or (preferably) two second connection switches 146 connect either one or (if there are two second connection switches) both of the first and second DC-DC converters, respectively, to the second associated secondary power port 130.

The sensory equipment preferably includes a battery monitor and/or identification controller configured to carry out a set of tasks that enables the system to operate at maximum utility. First, it preferably monitors battery features such as voltage and temperature to be used to achieve more rapid and/or efficient charge times. Second, it preferably identifies the battery's type, history and it allows for keeping track of the charge history, battery abuse events, and general data such as equalization schedules and amp-hour capacity for analysis and charge strategies. The sensory equipment can include, for example: communication equipment designed to receive communication signals from a vehicle battery controller and/or information module; electrical test equipment configured to sense the condition of batteries over the secondary power port; and/or data entry facilities configured such that system operators can provide the information to the sensory equipment. The identification controller may form part of the system controller.

Based on information that the distribution controller 148 receives from the sensory equipment about the vehicles connected to the two associated secondary power ports 128, 130, the distribution controller can ascertain how much power the vehicle batteries merit, and the distribution controller can communicate with the power controller 122 to determine the power available for charging the vehicles. Preferably that communication includes the actual connected battery information, but it could simply include a lower level of information such as the preferred power requirement (i.e., how much power they merit). The power controller uses information from the distribution controllers for all of the DC modules to determine the power distribution that each DC module can draw.

In a DC module 124 having four switches, the distribution controller 148 can control the configuration of the switches to provide for each of the DC-DC converters 140, 142 to provide current to either (or even both) associated secondary power ports 128, 130. Thus, either each secondary power port can simultaneously receive up to the full current capacity of one DC-DC converter, or either one of the secondary power ports can receive the combined current capacity of both DC-DC converters. In a typical DC module having three switches, one secondary power port would be able to receive the combined current capacity of both DC-DC converters, while the other would only be able to receive up to the full capacity of one DC-DC converter (while the other secondary power port simultaneously received the full capacity of the other DC-DC converter).

Some alternative embodiments of DC modules can be configured with greater numbers of DC-DC converters and/or greater numbers of secondary power ports. In such embodiments, each DC-DC converter can be configured to switchably connect between one, two, three or more, and even all of the available secondary power ports in the DC module.

Based on information that the distribution controller 148 has about the vehicles connected to the two (or perhaps more) associated secondary power ports 128, 130, and based on the power availability as determined by the power controller 122, the distribution controller controls the output of each DC-DC converter. By controlling both the DC-DC converter output and the switch configuration, the distribution controller controls the charging distribution to all of the vehicles connected to the DC module's associated secondary power ports. By changing the configuration and regulating the converters, the DC modules provide significant flexibility in charging capability. The power distribution is preferably based on a variety of factors, including each battery's: type; state of charge; secondary power port location; and charge type (e.g., equalization or fast-charging). Included in the power distribution determination are priority considerations, such as equalization's requirement for a specific current.

For example, suppose a first vehicle connected to the first associated secondary power port 128 requires an equalization, and a second vehicle connected to the second associated secondary power port 130 requires more rapid charging. Since there are two distribution controllers with a wide range of current control this standard operation can be accomplished by having the distribution controller 148 cause the closing of one first connection switch and one second connection switch such that the first and second DC-DC converters are respectively connected to the first and second secondary power ports. The distribution controller also causes the regulation DC-DC converters to regulate the available power, as determined by the power controller 122, accordingly by the needs of the two vehicles. If the two vehicles merit more power than is available, the equalization is preferably given priority since it requires a given level of current.

Likewise, if a first vehicle connected to the first associated secondary power port 128 requires a maximum speed charging, both of the first connection switches 144 would be closed to provide the capacity of both DC-DC converters to the vehicle. These concepts can be extended for greater numbers of DC-DC converters and/or greater numbers of secondary power ports in a DC module, providing an even greater level of flexibility while minimizing the necessary maximum capacity of any given DC-DC converter, and while maintaining the overall charging system current requirement to a minimum level (i.e., not exceeding the maximum power limit).

Optionally the distribution controller can be configured to control the charging distribution to at least one, some or all of the vehicles connected to the DC module's associated secondary power ports by providing a command signal to the vehicle battery controller. In this case, the vehicle battery(s) are configured to operate as a controlled load (i.e., the battery control system is configured with a load controller, which is circuitry and/or other devices to control the charge rate of the battery in response to a command signal).

Preferably, the control system, and more particularly the distribution controller, further acts as a charge controller to control the duty cycle of each converter so as to reduce the overall current harmonics that are seen by an upstream AC rectifier. For example, the charge controller can adjust the phase relation of the outputs by N/360° for switching events, where N is the number of DC-DC converters contained in a module. This controlling of the duty cycles to suppress current harmonics can increase energy efficiency. This is further described in U.S. Pat. No. 5,751,150, which, as noted above, is incorporated herein by reference.

Also, preferably one or more (and preferably all) the secondary power ports of the present invention are designed to be capable of both charging or discharging the electric powered vehicles, (i.e., they are bidirectional operating secondary power ports). The control system, and preferably the distribution controller can then use the switches and/or the power converters to distribute power discharged from one vehicle, and thereby supplement the available utility power to the other secondary power port(s) and/or to the DC bus. Thus, the DC module and/or DC converters, when attached to a vehicle battery, can both source and sink power.

Furthermore, in addition to having secondary power ports attached to vehicles (or other electrical devices) having batteries, one or more secondary power ports can be configured with a dedicated, semi-permanent (i.e., removed only for battery service or replacement, or for making the secondary power port available for other use), static (i.e., not typically mobile) energy storage device such as a typical rechargeable battery or ultra capacitor. This device, which shall be referred to herein as a dedicated battery, is dedicated in that it is configured and received not for other use, but rather only to provide energy storage so that power available from a given source (e.g., a utility or a vehicle) at a given time can be distributed to a given load at another time (such as a peak usage period). The control system is configured such that power from the dedicated battery can be distributed to vehicles through one or more secondary power ports.

Alternatively, and with reference to FIG. 4, one or more of dedicated batteries 160 can be hooked up to a battery module 162 having custom battery ports 164 that are configured differently than the secondary power ports. For example, the battery module could be customized to the configuration of one or more types of dedicated batteries that are designated for use with the charging system. In particular, such custom battery ports could have charging, discharging, control and/or sensory circuitry appropriate to the dedicated batteries.

If the charging system is configured with a dedicated battery, then the system controller can be configured to automatically direct power from the power source to charge and maintain the dedicated battery when less than all the power from the power port is otherwise in use (i.e., when the power provided by the power source does not exceed the maximum power limit). The system controller can further be configured such that, when secondary power port demand (i.e., the power that the vehicles merit) exceeds the power-source maximum power limit, the dedicated battery is automatically discharged to meet the power deficit between the demand and the power-source maximum power limit. The dedicated battery can also be used on other types of duty cycles, such as storing energy during periods when it is available at low cost and distributing energy when it is only available at high cost, or such as storing energy when it is available and distributing it when it is not available.

Furthermore, if a particular vehicle (or other rechargeable device) will not be needing power for an extended period of time, then the dedicated battery can be used in combination with a bidirectional secondary power port to store the power from that particular vehicle, later providing it for distribution to another vehicle's battery, or even back to the discharged vehicle's battery.

Possibly in addition to one or more of the secondary power ports being bidirectional, preferably one or more (and preferably all) of the primary power ports are bidirectional. In combination with bidirectional secondary power ports and/or a dedicated battery, and under the control of the control system, the bidirectional power ports can deliver power from the vehicles and/or dedicated batteries to either the utilities, or to other loads that share a common connection with the utilities. Such a delivery can recover power stored in the various batteries for a variety of purposes. If the primary power ports, but not the secondary power ports, are bidirectional, then the charging system will at least be able to recover unneeded power stored in dedicated batteries that have separate battery ports.

For example, if the vehicles and the charging system will be inactive for a significant period of time (from the standpoint of charge maintenance, energy cost, or the like), then the energy can be recovered from dedicated batteries, and preferably from vehicle batteries. This recovered power can be returned to the utilities, which may result in a recovery of energy expense. Likewise, the power can be used to offset energy usage in related facilities (e.g., power used to run security equipment in the building in which charging takes place). As another example, the charging system can help reduce total energy costs by time shifting usage to less expensive time periods. Likewise, the charging system can be used to provide additional power availability during time periods when the facility may face a cap on total power usage.

With reference to FIGS. 3A and 4-5, and as noted above, the combination of the power controller 122 and the distribution controllers 148 (and possibly any controllers related to sensing battery information) of the power processor 102 form the system controller that controls the power processor to limit its utility power usage while distributing the available power to one or more batteries. Although the sum of the power ratings for the secondary power ports may or do exceed the sum of the power ratings for the primary power port(s) (i.e., the maximum power limit), the system controller provides power limit commands that effectively serve to limit the power flow at one or more of the secondary power ports such that the power flow at the primary power port(s) do not exceed the respective power rating(s).

In another variation of the charging system, the system controller controls the net power distributed via the secondary power ports such that the power drawn from and provided by the primary power port(s) does not exceed a designated power limit that can be less than the maximum power limit. This designated power limit can be a constant value, such as an incremental amount below the power-source power rating to provide a safety margin, or even the maximum power limit itself.

Likewise, the designated power limit can be a function of time, such as a daily, weekly, monthly or yearly cycle to maintain power expenses within a budget. Alternatively, this designated power limit can be made to vary based on an external signal. The external signal can reflect a variety of different concerns, such as varying power cost, varying power availability, anticipated future needs, safety concerns, and emergency situations.

In embodiments where a varying designated power limit is used, the charging system may also be configured such that the aggregate output power rating is not greater than the maximum power limit. Instead, the aggregate output power rating is greater than one or more (or all) values that the designated power limit can become. Indeed, in a case (and only in the case) where the aggregate output power rating is not greater than the maximum power limit, the designated power limit can even be allowed to rise above the maximum power limit, as neither power limit will be reached. Thus, an embodiment of the charging system might be configured with an aggregate output power rating that is less than the maximum power limit of the power source, but with a designated power limit that cycles from a level above the aggregate output power rating (and possibly even above the maximum power limit) at night to a level below the aggregate output power rating during the day.

It should be understood that the control system can be implemented in other ways than described above. For example, the various controllers can be combined into a controller processing unit that carries out the functions of each combined controller. Likewise, the power controller can be implemented across a series of networked control systems (e.g., the distribution controllers), such as by implementing a token control system. More broadly, any function of the control system can be dedicated to a particular processing device, or can be distributed across a number of devices.

The related method of the invention comprises various combinations of the steps carried out by the components of the above described charging system. It further includes methods carried out by charging system developers and/or charging system operators in developing, manufacturing, setting up and using the above described charging system.

In particular, one method under the invention involves:
providing a charging system configured to charge a plurality of battery systems, the charging system having a limited power usage requirement;
attaching one or more battery systems to the charging system;
controlling the distribution of power from the charging system to each attached battery such that the total power used by the charging system does not exceed the power usage requirement.

While a particular form of the invention has been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited, and can be defined with reference to the following claims, among others.

We claim:

1. A charging system for charging a plurality of batteries from a power source, comprising:
   a primary power port configured to receive power from the power source, the primary power port being characterized by a power rating;
   a plurality of secondary power ports configured to distribute power from the primary power port to the plurality of batteries, each secondary power port being characterized by a power rating, wherein the sum of the secondary power port power ratings exceeds the primary power port power rating;
   one or more power converters configured to receive power from the primary power port and to provide power to the plurality of secondary power ports, the one or more power converters having a capacity to receive power from the primary power port at a level above the primary power port power rating, and
   a system controller including a power controller configured to regulate the power received from the primary power port by the one or more power converters to below the primary port power rating.

2. The system of claim 1, with at least some of the plurality of batteries having battery controllers separate from the system controller, wherein the system controller is configured to regulate power received from the primary power port by transmitting command signals appropriate to direct the battery controllers to regulate the power drawn by their respective batteries.

3. The system of claim 1, wherein the system controller is configured to operate at least one secondary power port of the plurality of secondary power ports bidirectionally.

4. The system of claim 1, wherein the system controller is configured to operate the primary power port bidirectionally.

5. The system of claim 1, and further comprising a buffer battery, wherein the system controller is further configured to distribute power from the buffer battery to at least one secondary power port of the plurality of secondary power ports.

6. The system of claim 5, wherein:
   the system controller is configured to direct power from the primary power port to the buffer battery when the power provided by the primary power port does not exceed the primary power port power rating; and
   the system controller is configured to direct power from the buffer battery to the at least one secondary power port when the plurality of batteries merits a net distribution of power from the secondary power ports in excess of the primary power port power rating.

7. An electric vehicle system for use with power from a power source, comprising:
   a plurality of electric vehicles, each electric vehicle having an associated battery; and
   the charging system of claim 1.

8. The system of claim 7, and further comprising a buffer battery, wherein the system controller is further configured to distribute power from the buffer battery to at least one secondary power port of the plurality of secondary power ports.

9. The system of claim 8, wherein:
   the system controller is configured to direct power from the primary power port to the buffer battery when the power provided by the primary power port does not exceed the primary power port power rating; and the system controller is configured to direct power from the buffer battery to the at least one secondary power port when the plurality of batteries merits a net distribution of power from the secondary power ports in excess of the primary power port power rating.

10. The system of claim 1, and further comprising:

a first charging module, wherein the plurality of secondary power ports includes a first secondary power port and a second secondary power port that receive power from the primary power port via the first charging module, the first charging module including a first power converter of the one or more power converters, the first power converter connecting to the first secondary power port, a second power converter of the one or more power converters, the second power converter connecting to the second secondary power port, a crossover switch switchably connecting the first power converter to the second secondary power port, and a module controller configured to control the operation of the crossover switch and establish the power distribution between the first and second secondary power ports.

11. The charging system of claim 10, wherein:

the first power converter of the first charging module connects to the first secondary power port through a first connecting switch of the first charging module;

the second power converter of the first charging module connects to the second secondary power port through a second connecting switch of the first charging module; and the module controller of the first charging module is configured to control the operation of the first and second connecting switches and establish the power distribution between the first and second secondary power ports.

12. The charging system of claim 11, wherein the module controller for the first charging module is separate from the power controller, and wherein the power controller and the module controller for the first charging module communicate to determine the operation of the crossover switch and the first and second connecting switches.

13. A charging system for charging a plurality of batteries from one or more power sources, comprising:

a plurality of primary power ports configured to concurrently receive power from the one or more power sources, wherein each primary power port is characterized by a power rating;

a plurality of secondary power ports configured to distribute power from the plurality of primary power ports to the plurality of batteries, each secondary power port being characterized by a power rating, wherein the sum of the secondary power port power ratings exceeds the sum of the primary power port power ratings;

one or more power converters configured to receive power from the plurality of primary power ports and to provide power to the plurality of secondary power ports, the one or more power converters having a capacity to receive power from the plurality of primary power ports at a level above the sum of the primary power port power ratings, and a system controller including a power controller configured to regulate the power received from the plurality of primary power ports by the one or more power converters to below the sum of the primary port power ratings.

14. The system of claim 13, wherein the system controller is further configured to regulate the power received from each primary power port of the plurality of primary power ports such that the power received from each primary power port does not exceed its respective power rating.

15. The system of claim 13, with at least some of the plurality of batteries having battery controllers separate from the power controller, wherein the power controller is configured to regulate the power received from the plurality of primary power ports by transmitting command signals appropriate to direct the battery controllers to regulate the power drawn by their respective batteries.

16. The system of claim 13, wherein the system controller is configured to operate at least one secondary power port of the plurality of secondary power ports bidirectionally.

17. The system of claim 13, wherein the system controller is configured to operate at least one of the plurality of primary power ports bidirectionally.

18. The system of claim 13, and further comprising a buffer battery, wherein the system controller is further configured to distribute power from the buffer battery to at least one secondary power port of the plurality of secondary power ports.

19. The system of claim 18, wherein:

the system controller is configured to direct power from the plurality of primary power ports to the buffer battery when the power provided by the primary power ports does not exceed the sum of the primary power port power ratings; and the system controller is configured to direct power from the buffer battery to the at least one secondary power port when the plurality of batteries merits a net distribution of power from the secondary power ports in excess of the sum of the primary power port power ratings.

20. An electric vehicle system for use with power from a power source, comprising:

a plurality of electric vehicles, each electric vehicle having an associated battery; and the charging system of claim 13.

21. The system of claim 20, and further comprising a buffer battery, wherein the system controller is further configured to distribute power from the buffer battery to at least one secondary power port of the plurality of secondary power ports.

22. The system of claim 20, wherein:

the system controller is configured to direct power from the plurality of primary power ports to the buffer battery when the power provided by the primary power ports does not exceed the sum of the primary power port power ratings; and the system controller is configured to direct power from the buffer battery to the at least one secondary power port when the plurality of batteries merits a net distribution of power from the secondary power ports in excess of the sum of the primary power port power ratings.

23. The system of claim 13, and further comprising:

a first charging module, wherein the plurality of secondary power ports includes a first secondary power port and a second secondary power port that receive power from the plurality of primary power ports via the first charging module, the first charging module including a first power converter of the one or more power converters, the first power converter connecting to the first secondary power port, a second power converter of the one or more power converters, the second power converter connecting to the second secondary power port, a crossover switch switchably connecting the first power converter to the second secondary power port, and a module controller configured to control the operation of the crossover switch and establish the power distribution between the first and second secondary power ports.

24. The charging system of claim 23, wherein:

the first power converter of the first charging module connects to the first secondary power port through a first connecting switch of the first charging module;

the second power converter of the first charging module connects to the second secondary power port through a second connecting switch of the first charging module; and the module controller of the first charging module is configured to control the operation of the first and second connecting switches and establish the power distribution between the first and second secondary power ports.

25. The charging system of claim 24, wherein the module controller for the first charging module is separate from the power controller, and wherein the power controller and the module controller for the first charging module communicate to determine the operation of the crossover switch and the first and second connecting switches.

26. A charging system for charging a plurality of batteries using power from a utility at a power level not exceeding a maximum power level, comprising:

a plurality of secondary power ports, each secondary power port being configured to electrically connect to at least one of the plurality of batteries, each secondary power port being characterized by a power rating;

a utility port configured to electrically connect to the utility, and to provide power from the utility to the plurality of secondary power ports;

a system controller including a power controller configured to control the power distribution between the utility port and the plurality of secondary power ports, wherein if the sum of the power ratings of the secondary power ports used to charge the plurality of batteries exceeds the maximum power level, the system controller controls the power distribution such that the plurality of batteries are simultaneously charged using power from the utility at a power level not exceeding the maximum power level; and a first charging module, wherein the plurality of secondary power ports includes a first secondary power port and a second secondary power port that receive power from the utility port via the first charging module, the first charging module including a first power converter connecting to the first secondary power port, a second power converter connecting to the second secondary power port, a crossover switch switchably connecting the first power converter to the second secondary power port, and a module controller configured to control the operation of the crossover switch and establish the power distribution between the first and second secondary power ports;

wherein the first power converter of the first charging module connects to the first secondary power port through a first connecting switch of the first charging module;

wherein the second power converter of the first charging module connects to the second secondary power port through a second connecting switch of the first charging module;

wherein the module controller of the first charging module is configured to control the operation of the first and second connecting switches and establish the power distribution between the first and second secondary power ports;

wherein the module controller for the first charging module is separate from the power controller; and wherein the power controller and the module controller for the first charging module communicate to determine the operation of the crossover switch and the first and second connecting switches.

27. A charging system for charging a plurality of batteries using power from a utility at a power level not exceeding a maximum power level, comprising:

a plurality of secondary power ports, each secondary power port being configured to electrically connect to at least one of the plurality of batteries, each secondary power port being characterized by a power rating;

a utility port configured to electrically connect to the utility, and to provide power from the utility to the plurality of secondary power ports;

a system controller including a power controller configured to control the power distribution from the utility port; and a first charging module, wherein the plurality of secondary power ports includes a first secondary power port and a second secondary power port that receive power from the utility port via the first charging module, the first charging module including a first power converter connecting to the first secondary power port, a second power converter connecting to the second secondary power port, a crossover switch switchably connecting the first power converter to the second secondary power port, and a module controller configured to control the operation of the crossover switch and establish the power distribution between the first and second secondary power ports;

wherein the first power converter of the first charging module connects to the first secondary power port through a first connecting switch of the first charging module;

wherein the second power converter of the first charging module connects to the second secondary power port through a second connecting switch of the first charging module;

wherein the module controller of the first charging module is configured to control the operation of the first and second connecting switches and establish the power distribution between the first and second secondary power ports;

wherein the module controller for the first charging module is separate from the power controller; and wherein the power controller and the module controller for the first charging module communicate to determine the operation of the crossover switch and the first and second connecting switches.

28. A charging system for charging a plurality of batteries from a power source, comprising:
- a primary power port configured to receive power from the power source, the primary power port being characterized by a power rating;
- a plurality of power converters configured to receive power from the primary power port, the power converters having a capacity to receive power from the primary power port at a level above the primary power port power rating;
- a plurality of secondary power ports configured to distribute power from the plurality of power converters, each secondary power port being characterized by a power rating, wherein the sum of the secondary power port power ratings exceeds the primary power port power rating; and
- a system controller configured to regulate the power that the plurality of converters draws such that if the sum of the power ratings of the secondary power ports simultaneously used to charge batteries exceeds the primary power port power rating, the power received from the primary power port does not exceed the primary power port power rating.

29. A charging system for charging a plurality of batteries from a plurality of power sources, comprising:
- a plurality of primary power ports configured to receive power from the plurality of power sources, each primary power port being characterized by a power rating;
- a plurality of power converters configured to receive power from the plurality of primary power ports, the power converters having a capacity to receive power from the plurality of primary power ports at a level above the sum of the primary power port power ratings;
- a plurality of secondary power ports configured to distribute power from the plurality of power converters, each secondary power port being characterized by a power rating, wherein the sum of the secondary power port power ratings exceeds the sum of the primary power port power ratings; and
- a system controller configured to regulate the power that the plurality of power converters draws such that if the sum of the power ratings of the secondary power ports simultaneously used to charge batteries exceeds the sum of the primary power port power ratings, the power received from the primary power ports does not exceed the sum of the primary power port power ratings.

30. The system of claim 29, wherein the system controller is further configured to regulate the power received from each primary power port of the plurality of primary power ports such that the power received from each primary power port does not exceed its respective power rating.

* * * * *